US012338370B2

(12) United States Patent
Lyytikäinen et al.

(10) Patent No.: US 12,338,370 B2
(45) Date of Patent: Jun. 24, 2025

(54) METHOD TO PRODUCE AN ADHESIVE COMPONENT COMPRISING STARCH AND MICROFIBRILLATED CELLULOSE, AN ADHESIVE AND PRODUCTS

(71) Applicant: Stora Enso OYJ, Helsinki (FI)

(72) Inventors: Katja Lyytikäinen, Imatra (FI); Isto Heiskanen, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 28 days.

(21) Appl. No.: 17/999,065

(22) PCT Filed: May 31, 2021

(86) PCT No.: PCT/IB2021/054752
§ 371 (c)(1),
(2) Date: Nov. 17, 2022

(87) PCT Pub. No.: WO2021/245531
PCT Pub. Date: Dec. 9, 2021

(65) Prior Publication Data
US 2023/0242795 A1 Aug. 3, 2023

(30) Foreign Application Priority Data
Jun. 1, 2020 (SE) .................... 2050622-6

(51) Int. Cl.
| C09J 103/02 | (2006.01) |
| B31F 5/04 | (2006.01) |
| B32B 3/28 | (2006.01) |
| B32B 7/12 | (2006.01) |
| B32B 29/00 | (2006.01) |
| B32B 29/08 | (2006.01) |
| C09J 11/06 | (2006.01) |
| C09J 11/08 | (2006.01) |
| D21H 27/36 | (2006.01) |

(52) U.S. Cl.
CPC ............. *C09J 103/02* (2013.01); *B31F 5/04* (2013.01); *B32B 3/28* (2013.01); *B32B 7/12* (2013.01); *B32B 29/005* (2013.01); *B32B 29/08* (2013.01); *C09J 11/06* (2013.01); *C09J 11/08* (2013.01); *D21H 27/36* (2013.01); *B32B 2255/12* (2013.01); *B32B 2255/24* (2013.01); *B32B 2307/718* (2013.01); *B32B 2307/7244* (2013.01)

(58) Field of Classification Search
CPC .......... C09J 103/02; C09J 11/06; C09J 11/08; B31F 5/04; B32B 3/28; B32B 7/12; B32B 29/005; B32B 29/08; B32B 2255/12; B32B 2307/718; B32B 2307/7244; D21H 27/36
USPC .......................................................... 524/35
See application file for complete search history.

(56) References Cited

U.S. PATENT DOCUMENTS 5,087,649 A 2/1992 Wegner et al.

FOREIGN PATENT DOCUMENTS

| CN | 107779122 A | 3/2018 | | |
| EP | 3444282 A1 | 2/2019 | | |
| EP | 3444310 A1 | 2/2019 | | |
| EP | 3591018 A1 | 1/2020 | | |
| WO | 9210554 | 6/1992 | | |
| WO | WO-2014072886 A1 * | 5/2014 | ............... | C08L 1/04 |
| WO | 2018083590 A1 | 5/2018 | | |
| WO | 2019034649 A1 | 2/2019 | | |
| WO | WO-2019207516 A1 * | 10/2019 | ........... | B32B 29/005 |

OTHER PUBLICATIONS

International Search Report from corresponding PCT application No. PCT/IB2021/054752 mailed on Aug. 18, 2021.
Fengel, D., Ultrastructural behaviour of cell wall polysaccharides, TAPPI, vol. 53, No. 3, pp. 497-503, 1970. (Abstract only).
Chinga-Carrasco, Gary, Cellulose fibres, nanofibrils and microfibrils: The morphological sequence of MFC components from a plant physiology and fibre technology point of view, Chinga-Carrasco Nanoscale Research Letters, 2011, 6:417.

* cited by examiner

*Primary Examiner* — Ling Siu Cho
*Assistant Examiner* — Ronald Grinsted
(74) *Attorney, Agent, or Firm* — Greer, Burns & Crain, Ltd.

(57) ABSTRACT

The present invention relates to a method for the production of an adhesive component wherein said method comprises the following steps: providing a suspension comprising starch granules, adding a suspension comprising microfibrillated cellulose to the suspension comprising starch granules, drying the starch granules and microfibrillated cellulose suspension to a dry content above 70 wt-% to form said adhesive component. The invention also relates to an adhesive, a corrugated board, paper and paperboard comprising said adhesive and to the adhesive component produced according to the method.

12 Claims, No Drawings

METHOD TO PRODUCE AN ADHESIVE COMPONENT COMPRISING STARCH AND MICROFIBRILLATED CELLULOSE, AN ADHESIVE AND PRODUCTS

This application is a U.S. National Phase under 35 U.S.C. § 371 of International Application No. PCT/IB2021/054752 filed May 31, 2021, which claims priority under 35 U.S.C. §§ 119 and 365 to Swedish Application No. 2050622-6 filed Jun. 1, 2020.

TECHNICAL FIELD

The present invention relates to a method to produce an adhesive component comprising microfibrillated cellulose (MFC). The invention also relates to an adhesive, a corrugated board, paper and paperboard comprising said adhesive and to the adhesive component produced according to the method.

BACKGROUND

Waterborne adhesives are becoming increasingly popular, since they represent an environmentally friendly and economically viable alternative to solvent-based counterparts. One type of waterborne adhesive comprises starch and there are many different end applications for starch based adhesive.

One application of starch based adhesive is in corrugated board. Corrugated board is a packaging material which can be converted to different types of packaging solutions. The corrugated board is a fiber based material comprising a corrugated medium (fluting) and at least one flat liner or linerboard attached onto a surface of the fluted medium, thus forming a sandwich structure. The corrugated medium is formed by using heat, moisture and pressure, into a corrugated shape using a corrugator. One or two liners are glued to the tips of the corrugated medium with an adhesive. The starch based adhesives used in corrugated boards are typically four component systems comprising of carrier or cooked starch, a raw starch component, caustic soda, and borax. The physical properties and chemical reactivity of the final adhesive can be adjusted by various means such as using modified starch, by changing borax concentration or using other cross-linkers.

A common problem with produced corrugated boards is that they tend to curl up or down. This problem is also called warp. Another common problem with corrugated board is the wash-board effect, also called wash-boarding. This effect is more pronounced for corrugated board comprising lower grammage liner in the top layer/s. Wash-boarding is an undesired effect resulting from the corrugated board manufacturing process which might become even more visible after printing the surface.

Another application of starch based adhesives is as an adhesive between paper or paperboard plies to improve the adhesion of the plies during multilayer paper or paperboard production. Starch based adhesives may also for example be used in bags or packages with a transparent window where a transparent paper or film which forms the window is attached to the bag or package with the adhesive.

Important features for starch based adhesive especially used in papermaking industry, i.e. for production of paper, paperboard or corrugated board, is that the adhesive has good strength and good water holding capacity.

There are different ways to improve the performance of starch based adhesive. One way to improve the strength of the starch based adhesive is to add different strength improving additives to the adhesive. One additive that can be used to improve the strength of the adhesive is addition of microfibrillated cellulose. One drawback with addition of microfibrillated cellulose is that it forms a gel already at very low dry contents, consequently large amounts of water is added together with the microfibrillated cellulose. Also, dewatering and drying of microfibrillated cellulose is very difficult since the fibrils will hornificate during drying and it is thus very difficult to re-disperse dried microfibrillated cellulose to achieve the improvements in strength.

There is thus a need to solve the problems mentioned above for a starch based adhesive.

SUMMARY

It is an object of the present invention to produce an adhesive component and adhesive which eliminates or alleviates at least some of the disadvantages of the prior art. More specific objects include providing an adhesive component and adhesive that has improved strength, e.g. reduced brittleness, and water holding capacity. One object is also to produce an adhesive in a more cost efficient way.

The invention is defined by the appended independent claims. Embodiments are set forth in the appended dependent claims and in the following description.

The present invention relates to a method for the production of an adhesive component wherein said method comprises the following steps: providing a suspension comprising starch granules, adding a suspension comprising microfibrillated cellulose to the suspension comprising starch granules, drying the starch granules and microfibrillated cellulose suspension to a dry content above 70 wt-% to form said adhesive component. By the present invention it was found a way to use microfibrillated cellulose in an adhesive component without the negative drawbacks such as the need to add large amounts of water. Also, it was found that the drying of the suspension comprising both starch and microfibrillated cellulose prevents hornification of the MFC. Consequently, it is possible to dry the adhesive component comprising MFC to a much higher dry content and still keep the MFC "active", i.e. the MFC is not hornificated. The adhesive component is used in an adhesive.

The starch granules and microfibrillated suspension is preferably dried to a dry content of 75-97 wt-%. Consequently, the adhesive component preferably has a dry content of 75-97 wt-%.

The adhesive component preferably comprises starch granules in an amount above 50 wt %, preferably between 50-99.5 wt % or even more preferably between 60-90 wt % of the total solid content of the adhesive component. The adhesive component preferably comprises microfibrillated cellulose in an amount between 0.5-50 wt-%, preferably between 2-30 wt-% or even more preferred between 2-20 wt-% of the total solid content of the adhesive component. The amount of starch and MFC added to the adhesive component depends for example on the quality of the MFC used, the type of starch used and the desired properties of the final adhesive component to be achieved.

The starch granules in the adhesive component is preferably native starch. The starch granules can also be chemically modified starch. Depending on the end use of the adhesive component the appropriate starch granules can be chosen. For fiber-based products it is preferred to use native starch. The chemically modified starch can be used to improve for example the reactivity of the starch, the rheology properties of the adhesion and the water resistance.

The method further comprises the step of adding a cross-linker to the suspension comprising microfibrillated cellulose and starch granules. The amount of cross-linker added is preferably between of 1-40% by weight based on the amount of starch, preferably between 5-40% by weight. It was found that the addition of cross-linker has even further facilitated the redispersion of the dried adhesive component. The cross-linker may be citric acid, tartaric acid, 1,2,3,4-butanetetracarboxylic acid, formaldehyde, urea formaldehyde, melamine formaldehyde, glyoxal and/or metallic salts such as ammonium zirconium carbonate.

The adhesive component is preferably re-dispersable in an aqueous suspension after drying. Consequently, it is possible to re-disperse the adhesive component which can been seen in the viscosity of the re-dispersed adhesive component. The suspension comprising starch and microfibrillated cellulose should preferably have basically the same viscosity before drying and after drying and re-dispersion. With basically the same viscosity is meant that at same solid content and pH, the viscosity after redispersion is not deviating more than 30% from the original viscosity.

The present invention also relates to a method for the production of an adhesive wherein said method comprises the following steps: producing an adhesive component by providing a suspension comprising starch granules, adding a suspension comprising microfibrillated cellulose to the suspension comprising starch granules, drying the starch granules and microfibrillated cellulose suspension to a dry content above 70% by weight to produce said adhesive component, and re-disperse the dried adhesive component in a suspension forming said adhesive. The adhesive is thus formed by re-disperse the dried adhesive component comprising microfibrillated cellulose and starch granules in a suspension. The liquid media in the suspension is preferably an aqueous solution.

An adhesive may also be formed by further treating the re-dispersed adhesive component in the following step: swelling the re-dispersed adhesive component by alkali or temperature treatment or by cooking the re-dispersed adhesive component.

The present invention also relates to a corrugated board comprising a corrugated medium and a liner and an adhesive arranged to attach the fluted corrugated medium to the liner wherein the adhesive is produced as described herein. The corrugated board preferably comprises adhesive in an amount of 2-20 g/m$^2$ (dry). The liner of the corrugated board preferably has a grammage below 160 g/m$^2$. By the use of the adhesive according to the present invention in a corrugated board both curl and washboard tendencies can be reduced. Also, it was found possible to reduce the weight of the corrugated board, e.g. by reducing the grammage of the liner, without achieving problems with wash-boarding and/or curl.

The present invention further relates to a paper or paperboard product comprising at least two plies wherein an adhesive is arranged to improve the adhesion between the plies wherein the adhesive is produced as described herein. It has been found that the ply adhesion can be improved by the use of the adhesion of the present invention which will provide the paper or paperboard product with improved strength and converting properties.

The present invention also relates to an adhesive produced according to the method described herein. The adhesive preferably has a solid content of 10-45 wt-%. According to the present invention it is possible to produce an adhesive comprising microfibrillated cellulose wherein the adhesive has a high dry content.

The present invention also relates to an adhesive component produced according to the method described herein.

DETAILED DESCRIPTION

The present invention relates to a method for production of an adhesive component in an adhesive wherein said method comprises the following steps: providing a suspension comprising starch granules, adding a suspension comprising microfibrillated cellulose to the suspension comprising starch granules, drying the starch granules and microfibrillated cellulose suspension to a dry content above 70 wt-% to form said adhesive component.

By the present invention it was found a way to use microfibrillated cellulose in an adhesive without the negative drawback such as the need to add large amounts of water. Consequently, by using the adhesive component according to the invention in an adhesive it is possible to achieve the benefits of microfibrillated cellulose, e.g. improved strength, rheological properties and water holding capacity, without addition of large amounts of water. With improved strength is meant that the adhesive has improved bonding properties with reduced brittleness. It has surprisingly been found that by addition of microfibrillated cellulose to a suspension comprising starch followed by dewatering and drying the mixture to a dry content above 70% by weight it was still possible to re-disperse the adhesive component and the microfibrillated cellulose was found to still be "active", i.e. the fibrils of the microfibrillated cellulose had not hornificated. The reason to why it works, i.e. to why the microfibrillated cellulose is not hornificated during drying is not fully understood but it is assumed that the starch granules hinders the hornification to occur, probably by acting as a carrier matrix to the microfibrillated cellulose. One advantage with the present invention is also that it is possible that the production of the adhesive component of the adhesive is done at one site and the adhesive component is then transported to another site where the production of the adhesive will take place. Since it is possible to increase the dry content of the adhesive component, it is economically feasible to transport the adhesive component according to the invention comprising microfibrillated cellulose. Consequently, it is not necessary to transport low consistency microfibrillated cellulose for the production of adhesives or for adhesive producers to start own production of microfibrillated cellulose on site.

The drying of the mixture of starch granules and microfibrillated cellulose needs to be done in a controlled way. It is important that the starch granules are not significantly destroyed during the drying stage. After the drying of the mixture the starch granules should still be in the form of visible granules. The drying should preferably be done at a temperature below 100° C. or if dried at higher temperature, the conditions should be such that the starch is not dissolved. Example of dewatering devices are e.g. rotary vacuum filter, whereas the filter cake is then dried with e.g. flash or cyclone driers. The microfibrillated cellulose is preferably added to starch granules after cleaning and removal of fiber and hulls and other components using e.g. centrifugal cleaners or hydrocyclones or centrifugation. The microfibrillated cellulose is preferably a wood-derived microfibrillated cellulose.

The dry content of the composition comprising starch granules and microfibrillated cellulose after drying is preferably above 70 wt-%. It is important not to dry the composition too harsh or to too high dry contents since it is important that the composition is re-dispersable. The dry content of the composition after drying is preferably between 70-97 wt-%, more preferably between 70-95 wt-% or even more preferred between 75-97 wt-% after drying. If no cross-linker, e.g. citric acid, is added it is preferred that the dry content of the composition is between 70-95 wt-%, preferably between 70-90 wt-%, 70-85 wt-% or even more preferred between 75-90 wt-%. The dry content of the composition is preferably between 80-97 wt-%, preferably between 85-97 wt-% or even more preferred between 90-97 wt-% after drying if a cross-linker is added to the composition.

The starch is in the form of granules, i.e. the starch is not in dissolved form. It is believed that the microfibrillated cellulose interact with the starch granules and this is one of the reasons to why the microfibrillated cellulose does not hornificate during drying.

The starch may be native starch granules. It is also possible to use chemically modified starch granules. The starch used in the adhesive component and adhesive can be extracted from a wide variety of plants. Example of starches that can be used are corn, wheat, potato, tapioca, rise, barley, waxy corn, genetically modified such as high amylose content starches. Example of starches that are derivatized, i.e. chemically modified, are oxidized starches, starch ethers, starch esters, cationic starches, dextrins, grafted starches, hydrophobic starches, aldehyde starches, anionic starches such as carboxymethylated starches. The starch and MFC suspension might also be converted at the point of use using chemical or thermo-chemical or enzymatic conversion techniques. It is also possible to add MFC before making the starch derivatization, although post addition is preferred in some cases.

The method further comprises the step of adding a cross-linker to the suspension comprising microfibrillated cellulose and starch granules. The amount of cross-linker added is preferably between of 1-40% by weight based on the amount of starch, preferably between 5-40% by weight. It was found that the addition of cross-linker has even further facilitated the redispersion of the dried adhesive component. The cross-linker may be citric acid, tartaric acid, 1,2,3,4-butanetetracarboxylic acid, formaldehyde, urea formaldehyde, melamine formaldehyde, glyoxal and/or metallic salts such as ammonium zirconium carbonate. The cross-linker is preferably added to the suspension comprising both microfibrillated cellulose and starch granules, however it can also be added to the suspension comprising microfibrillated cellulose and/or the suspension comprising starch granules before the two suspensions are mixed together.

It may be preferred that the starch and microfibrillated suspension is buffered, i.e. that it comprises a mixture of organic acid and an alkali, preferably sodium hydroxide. The buffered solution is prepared by adding the alkali into the organic acid solution until the solution has the desired pH. The amount of alkali used depends on the strength of the organic acid used as well as the desired pH of the solution. The pH of the solution is preferably between 3.5-10. If a cross-linker is added or the organic acid is citric acid or any other cross-linker the pH of the suspension is preferably between 2.5-8. It has been found that by controlling the pH an improved cross-linking of the material can be achieved.

The adhesive component is preferably re-dispersable in an aqueous suspension after drying. Consequently, it is possible to re-disperse the adhesive component which can been seen in the viscosity of the re-dispersed adhesive component. The suspension comprising starch and microfibrillated cellulose should preferably have basically the same viscosity before drying and after drying and re-dispersion. With basically the same viscosity is meant that at same solid content and pH, the viscosity after redispersion is not deviating more than 30%, preferably not more than 20% or even more preferably not more than 10% from the original viscosity. It is important that the same temperature, pH, concentration, rpm and measurement method is used when comparing the viscosities. If a cross-linker is added it will cross-link the starch granules and change the viscosity of the suspension. Consequently, the viscosity might change due to the addition of cross-linker and such change needs to be taken into account and should not be seen as a result that the adhesive component is not re-dispersed.

There are also other ways to evaluate re-dispersion besides by viscosity measurements. One way is to evaluate the suspension by optical means. High dispersability gives a suspension which is substantially free from large agglomerates or flakes which are significantly larger than individual microfibrillated fibers or starch particles. Particle size measurement or fractionation can be utilized to characterize especially non-dissolved large particles. The amount of these should preferably be less than 20 wt % based total solid of the suspension.

The starch granules might be pre-cooked by the addition of steam before or after addition of microfibrillated cellulose. The pre-cooked starch granules and microfibrillated cellulose mixture is thereafter dried. It is preferred that chemically modified starch granules are pre-cooked with addition of steam. By pre-cooking the starch granules, the starch will be cold water soluble and no additional cooking is necessary.

The present invention also relates to a method for the production of an adhesive wherein said method comprises the following steps: producing an adhesive component by providing a suspension comprising starch granules, adding a suspension comprising microfibrillated cellulose to the suspension comprising starch granules, drying the starch granules and microfibrillated cellulose suspension to a dry content above 70% by weight to produce said adhesive component, and re-disperse the dried adhesive component in a suspension forming said adhesive. The adhesive is thus formed by re-disperse the dried adhesive component comprising microfibrillated cellulose and starch granules in a suspension. The liquid media in the suspension is preferably an aqueous solution. The suspension may also comprise other components such as water, sodium hydroxide, modified starch, dextrin and/or boric acid. Other additives, such as additives to improve the wet strength or adhesive bond strength could also be added. Also, other functional chemicals in order to improve e.g. moisture resistance or gelling behavior can be added, e.g. borax, glyoxal or mixtures thereof.

An adhesive may also be formed by further treating the re-dispersed adhesive component in the following step: swelling the re-dispersed adhesive component by alkali or temperature treatment or by cooking the re-dispersed adhesive component. The cooking is preferably done at a temperature above 90° C. either in a batch or continuous cooker. It is possible to use steam and to cook at high temperature and pressure. The swelling in alkali is preferably done according to the Stein-Hall method. The alkali used is preferably sodium hydroxide.

The adhesive produced is especially suitable in board production, e.g. for the production of corrugated board or for increasing ply adhesion when making multi-ply paperboard. The adhesive has been found to both provide good strength but also good water holding capacity. These are very important properties in paperboard or corrugated board production since it reduced the problems with e.g. wash-boarding, warp and brittle ply adhesion. However, the adhesive may also be used for other end applications where starch based adhesives normally are used, e.g. lamination of paper or similar end uses.

The adhesive produced is a water based adhesive that besides starch granules and microfibrillated cellulose also may comprise water, sodium hydroxide, modified starch, dextrin and/or boric acid. Other additives, such as additives to improve the wet strength or adhesive bond strength could also be added. Also, other functional chemicals in order to improve e.g. moisture resistance or gelling behavior can be added, e.g. borax, glyoxal or mixtures thereof.

The suspension comprising starch granules and microfibrillated cellulose is preferably mixed in order for the two suspensions, i.e. the suspension comprising microfibrillated cellulose and the suspension comprising starch granules, to be evenly dispersed in the suspension before drying the mixture. The mixing can be done in any conventional way as described in prior art and which is well known for a person skilled in the art. The dry content of the suspension comprising starch granules is preferably between 0.5-50 wt % and the dry content of the suspension comprising microfibrillated cellulose is preferably between 0.1-20 wt % before the two suspension are mixed. It may also be possible to add the MFC in dry form to the suspension comprising starch granules.

One way to pre-activate the adhesive component is to subject the suspension comprising microfibrillated cellulose and starch granules to high shear forces, for example in a high shear mixer such as rotor-stator mixer or fluidizer or homogenizer by applying a high pressure drop. This improves homogeneity of the suspension and can also disrupt the starch granules, i.e. depending on the type of starch used.

The present invention also relates to a corrugated board comprising a corrugated medium and a liner and an adhesive arranged to attach the fluted corrugated medium to the liner wherein the adhesive is produced as described herein. The corrugated board comprises at least one corrugated medium and at least one liner. The corrugated board preferably comprises at least two liners and at least one corrugated medium. The corrugated board may also comprise more than one corrugated mediums and more than two liners. The liner is attached to at least one surface of the corrugated medium by the adhesive. The adhesive is preferably applied on a least one surface of the fluted corrugated medium and the liner is thereafter attached to said surface. The corrugated board preferably comprises adhesive in an amount of 2-20 g/m$^2$ (dry). The corrugated board preferably comprises a liner having a low grammage, preferably below 160 g/m$^2$. It is a surprise that even using low grammage liner the washboarding problems is strongly reduced by using the adhesive according to the invention. Consequently, the present invention makes it possible to produce a more light-weight product.

The present invention further relates to a paper or paperboard product comprising at least two plies wherein an adhesive is arranged to improve the adhesion between the plies wherein the adhesive is produced as described herein. By the use of the adhesive comprising the adhesive component according to the present invention it was found that the ply adhesion was improved. Consequently, the ply adhesion was less brittle and it improved the converting properties of the paper or paperboard product.

The corrugated board liner/s and/or corrugated medium and or paper or paperboard product may be produced by any kind of pulp, e.g. chemical pulp, mechanical pulp, thermomechanical pulp and chemi-thermomechanical pulp (CTMP), and neutral sulphite semi-chemical (NSSC) pulp. The pulp may further be any one of a virgin and a re-cycled pulp.

It may also be possible to use the adhesive according to the present invention as a paste between a ply of paper or paperboard and a ply comprising high amounts of microfibrillated cellulose, such as a MFC film or a high density paper. It was found that the adhesive according to the invention not only provides inter-ply strength, but it will also improve the barrier properties of the product. Consequently, it is an advantage to use the adhesive in products where barrier properties, such as oxygen barrier properties is important.

The present invention also relates to an adhesive produced according to the method described herein. The adhesive preferably has a solid content of 10-45 wt-%. According to the present invention it is possible to produce an adhesive comprising microfibrillated cellulose wherein the adhesive has a high dry content. The adhesive preferably comprises 0.1-50 wt-% of microfibrillated cellulose based on total dry solid content of the adhesive.

The present invention also relates to an adhesive component produced according to the method described herein.

Microfibrillated cellulose (MFC) shall in the context of the patent application mean a nano scale cellulose particle fiber or fibril with at least one dimension less than 1000 nm. MFC comprises partly or totally fibrillated cellulose or lignocellulose fibers. The liberated fibrils have a diameter less than 1000 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 10 to about 300 m$^2$/g, or more preferably 30-200 m$^2$/g when determined for a freeze-dried material with the BET method.

Various methods exist to make MFC, such as single or multiple pass refining, pre-hydrolysis followed by refining or high shear disintegration or liberation of fibrils. One or several pre-treatment steps are usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), phosphorylated or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

Example

Microfibrillated cellulose (MFC) was mixed with uncooked native starch granules so that the dry content of the mixture was 5 wt-% and the amount of MFC was been 5-25 wt-% of the oven dried weight of the starch. In addition, to one mixture comprising 10 wt-% of MFC, 20 wt-% of citric acid (based on oven dried weight of starch granules) was also added.

The viscosity of the formed slurries was determined (Brookfield; 100 rpm). 400 g of each starch/MFC mixture were dried in ambient temperature or in an oven in 60° C. The dried materials were then re-dispersed in water. The samples dried in room temperature were mixed for 2 minutes using a rod mixer, followed by magnetic stirring for 10 minutes, after which the samples were allowed to stand for at least 1.5 hours before determining the viscosity of the mixtures again. For oven-dried samples the following procedure was attempted to re-disperse the samples: rod mixing for 2 minutes, magnetic stirring for 30 minutes, standing for 1.5 hours, rod mixing for 2 minutes, magnetic stirring for 30 minutes. Of the oven-dried sample, only the sample comprising citric acid was re-dispersible in water. The results are shown in Table 1.

TABLE 1

| Starch slurry, wt-% | MFC, wt-% of starch | Citric acid, wt-% of starch | Dry content prior to re-dispersing, % | | Viscosity of the slurry, 100 rpm, mPas | | |
|---|---|---|---|---|---|---|---|
| | | | Air-dried* | Oven-dried | Initial | Air-dried and redisp. | Oven-dried and redisp |
| 5 | 5 | — | 75.7 | 96.8 | 19 | 22 | Not dispersable |
| 5 | 10 | — | 86.2 | 96 | 69 | 67 | Not dispersable |
| 5 | 15 | — | 76.8 | 96.4 | 190 | 193 | Not dispersable |
| 5 | 25 | — | 41.6 | 95.8 | 755 | 746 | Not dispersable |
| 5 | 10 | 20 | 96.0 | 96.7 | 60 | 66 | 80 |

It can be seen from Table 1 that even though the mixture of starch and MFC is dried to dry contents above 70 wt-% it is still possible to re-disperse the mixture. If the dry content is above 95 wt % it was still possible to re-disperse the mixture if citric acid was added.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of an adhesive component wherein said method comprises the following steps:
   providing a suspension comprising starch granules,
   adding a suspension comprising microfibrillated cellulose to the suspension comprising starch granules to form a starch granules and microfibrillated cellulose suspension,
   drying the starch granules and microfibrillated cellulose suspension to a dry content above 70% by weight to form the adhesive component, wherein the starch granules in the adhesive component comprise visible granules.

2. The method according to claim 1 wherein the starch granules and microfibrillated cellulose suspension is dried to a dry content of 75-97% by weight.

3. The method according to claim 1, wherein the adhesive component comprises starch granules in an amount above 50 wt % of a total solid content of the adhesive component.

4. The method according to claim 1, wherein the adhesive component comprises microfibrillated cellulose in an amount between 0.5-50 wt-% of a total solid content of the adhesive component.

5. The method according to claim 1, wherein the starch granules in the adhesive component comprise native starch, or chemically modified starch, or a combination thereof.

6. The method according to claim 1, further comprising the step of:
   adding a cross-linker to the starch granules and microfibrillated cellulose suspension.

7. The method according to claim 6, wherein the cross-linker is added in an amount of 1-40% by weight based on an amount of starch.

8. The method according to claim 6, wherein the cross-linker comprises citric acid.

9. The method according to claim 1, wherein the adhesive component is re-dispersable in an aqueous suspension after drying.

10. The method according to claim 9, wherein a viscosity of the starch granules and microfibrillated cellulose suspension is the same before drying and after drying and re-dispersion.

11. A method for the production of an adhesive, wherein said method comprises the following steps:
    producing an adhesive component by providing a suspension comprising starch granules,
    adding a suspension comprising microfibrillated cellulose to the suspension comprising starch granules to form a starch granules and microfibrillated cellulose suspension,
    drying the starch granules and microfibrillated cellulose suspension to a dry content above 70% by weight to produce a dried adhesive, wherein the starch granules in the adhesive component comprise visible granules, and
    re-dispersing the dried adhesive in a suspension forming a re-dispersed adhesive.

12. The method according to claim 11 wherein the method further comprises the step:
    swelling the re-dispersed adhesive by alkali or temperature treatment or by cooking the re-dispersed adhesive.

* * * * *